United States Patent [19]
Kugler

[11] 3,915,392
[45] Oct. 28, 1975

[54] BALE HAY CHOPPER AND SHREDDER

[76] Inventor: Henry Dale Kugler, Rte. 2, Box 118, Cozad, Nebr. 69130

[22] Filed: Aug. 17, 1973

[21] Appl. No.: 389,387

[52] U.S. Cl. .................. 241/74; 241/223; 241/229; 241/236; 241/243
[51] Int. Cl.² .......................................... B02C 4/10
[58] Field of Search ............. 241/74, 222, 223, 227, 241/229, 236, 243

[56] References Cited
UNITED STATES PATENTS

| | | | |
|---|---|---|---|
| 2,626,159 | 1/1953 | Thompson | 241/222 X |
| 2,842,175 | 7/1958 | Thompson | 241/243 |
| 3,170,642 | 2/1965 | Haidler | 241/223 X |
| 3,375,986 | 4/1968 | Dodgen et al. | 241/222 |
| 3,589,627 | 6/1971 | Torrence | 241/236 UX |
| 3,656,697 | 4/1972 | Nelson | 241/236 X |

FOREIGN PATENTS OR APPLICATIONS

| 863,862 | 1/1953 | Germany | 241/236 |
|---|---|---|---|

*Primary Examiner*—Granville Y. Custer, Jr.
*Assistant Examiner*—Howard N. Goldberg
*Attorney, Agent, or Firm*—Zarley, McKee, Thomte & Voorhees

[57] ABSTRACT

A conveyor feeds cylindrical bales to the chopper and shredder which includes three rotary cylindrical cutters extending across the feeder at the forward end and rearwardly over the feeder whereby the hay is compressed by the cutters and the conveyor. A discharge conveyor is provided under the cutters for removing cut and chopped hay. The housing extends over the back side of the cutters and screens are provided between the cutters and the housing wall thereby defining a chamber into which hay is blown and falls to the bottom for discharge by the discharge conveyor. A throat is provided rearwardy of the cutters and includes an arcuate frame to which forwardly extending spring biased inwardly pivotal members are provided for guiding the hay into the cutters. Rearwardly extending flexible rubber flaps are secured to the arcuate frame and extend rearwardly and radially inwardly and then forwardly to prevent chopped hay from being thrown rearwardly. The cutters include spiral rings running the length thereof held in spaced relation to the cylinders of the cutters by upstanding posts. Blades are secured in spaced relationship along the spiral rings. Stationary blades are provided between the cutters and between the feeder and the bottom cutter.

8 Claims, 7 Drawing Figures

BALE HAY CHOPPER AND SHREDDER

One of the popular methods of making hay involves rolling the hay into giant round bales. These bales are a compromise between stacks of hay left in the field and smaller round or square bales. These giant round bales can be handled individually in big packages with special equipment. Once the hay is removed from the field it is often desirable to chop and shred it for feeding purposes or storage in a silo or the like. The hay chopper and shredder of this invention will readily handle these large bales and convert them into shredded hay which may be handled by an auger type conveyor for feeding into a silo, other types of conveyor systems, or feeding directly to animals to be fed.

The round bales are placed on a conveyor belt type conveyor which is related in its speed to the ease with which the chopper and shredder handles the hay being fed to it. The hay passes through a guide ring which has flexible flaps on its rear side which extend radially inwardly and forwardly in conjunction with forwardly extending pivotal spring biased fingers adapted to engage the round bale of hay as it approaches the cutters. Three cylindrical cutters are provided in stair-step fashion upwardly and rearwardly from the conveyor thereby compressing the hay against the conveyor as it is fed into the cutters. An auger is provided below the bottom cutter for removing the chopped and shredder hay. The cutters each include a spiral ring to which spaced apart cutting blades are secured. These blades on adjacent cutters cooperate in chopping and shredding the hay and also cooperate with stationary blades between the cutters and between the bottom cutter and the feeder conveyor. The ring on which the blades are mounted limits hay against getting below the inner ends of the cutting blades.

A housing is provided on the opposite side of the cutters from the conveyor and includes a screen having a curvature corresponding to the cutters such that the screen and the housing provide a passageway for blown hay to be transmitted to the discharge auger at the bottom of the housing.

This invention consists in the construction, arrangements and combination of the various parts of the device, whereby the objects contemplated are attained as hereinafter more fully set forth, specifically pointed out in the claims, and illustrated in the accompanying drawings in which:

Figures 1, 2:
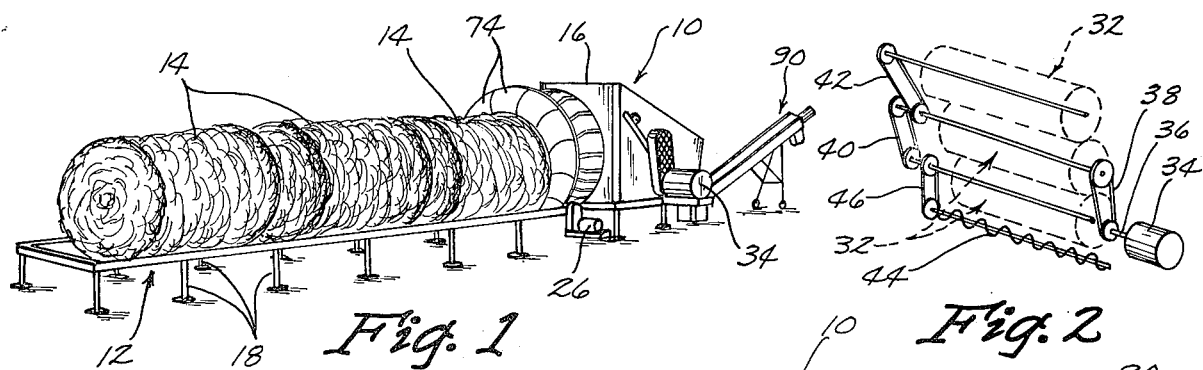
FIG. 1 is a perspective view of the hay chopper and shredder in operation with several round bales on the feeder conveyor being fed into the machine.
FIG. 2 is a view of the cutters and the drive means for operating them along with the discharge auger.
Figure 3:
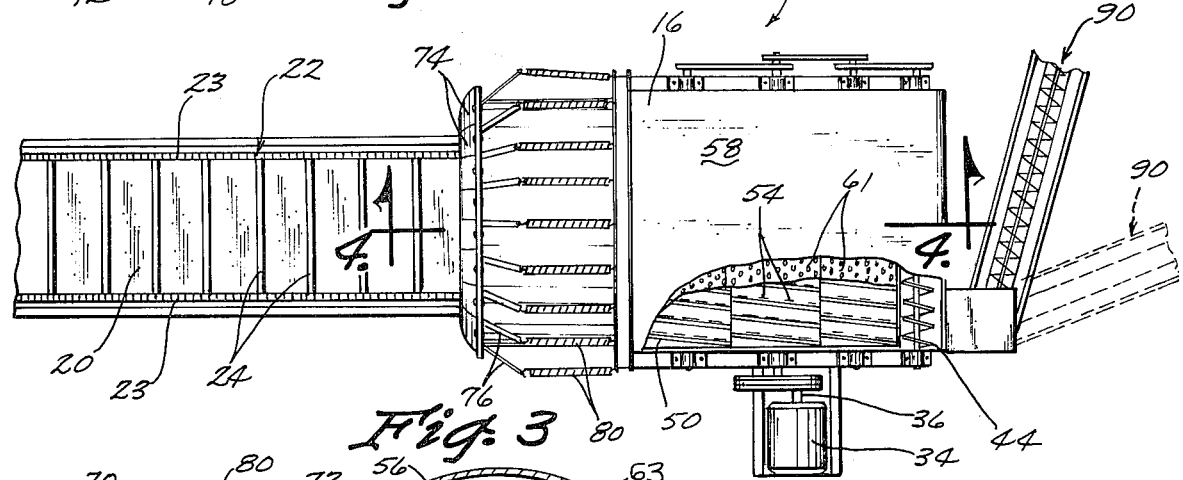
FIG. 3 is a top plan fragmentary view of the chopper and shredder.

The hay chopper and shredder of this invention is referred to generally in FIG. 1 by the reference numeral 10 and includes a feeder conveyor 12 on which large or giant size round bales 14 are fed to the chopper and shredder unit 16.

The feeder conveyor 12 is supported on posts 18 and includes a support platform 20 over which a conveyor chain 22 moves. A conveyor chain is comprised of side chains 23 interconnected by slats 24. A motor 26 is provided for driving the conveyor by causing the shaft 28 to rotate in turn rotating sprocket 30 connected to the side chains 23. The drive system for the chopper and shredder unit includes a potential meter which causes the conveyor motor to stop when the shredder unit is overloaded and upon the chopper and shredder unit being able to take more hay the chopper motor will be relieved of its overload condition thereby starting the feed conveyor.

The chopper and shredder unit 16 includes three rotary cutters 32 arranged in stair-step fashion, one over the other, with the bottom cutter being closely adjacent the forward or inner end of the feeder conveyor and the middle and upper cutters being positioned above and rearwardly over the feeder conveyor.

A 50 h.p. motor 34 is seen in FIG. 2 connected to a shaft 36 which in turn drives the middle cutter through a belt 38 while the bottom and top cutters are connected by belts 40 and 42. A discharge auger 44 is driven by a belt 46 connected to the drive shaft of the lower cutter. Cutters 32 rotate counterclockwise as viewed in FIG. 4.

The cutters 32 include cylinders 48 on which a spiral ring 50 is positioned along the length thereof. The ring is spaced from the cylinder 48 by a plurality of spaced apart posts 52. A plurality of spaced apart sickle-type cutter blades 54 are riveted to the posts 52 by rivets 56. The ring 50 is wider than the post 52 and thus functions as a ledge to limit hay against getting below the blades 54 between the cylinder 48 and the blades 54. It is seen that the one continuous spiral ring 50 conveniently spaces the blades 54 not only around the periphery of the cylinder but longitudinally thereof without the need of a plurality of circular rings being employed thereby reducing material and labor costs substantially.

A housing 58 is provided over the cutters 32 and extends around the auger 44 thereby providing a trough 60. A concave screen 61 is provided for each of the cutters closely adjacent the cutters below the housing 58 thereby providing a chamber 62 therebetween into which chopped and shredded hay 64 flows and gravitates to the discharge auger 44. The screens are secured to supports 63, 65 and 67 which are secured to housing 58 by any convenient means.

Figure 4:
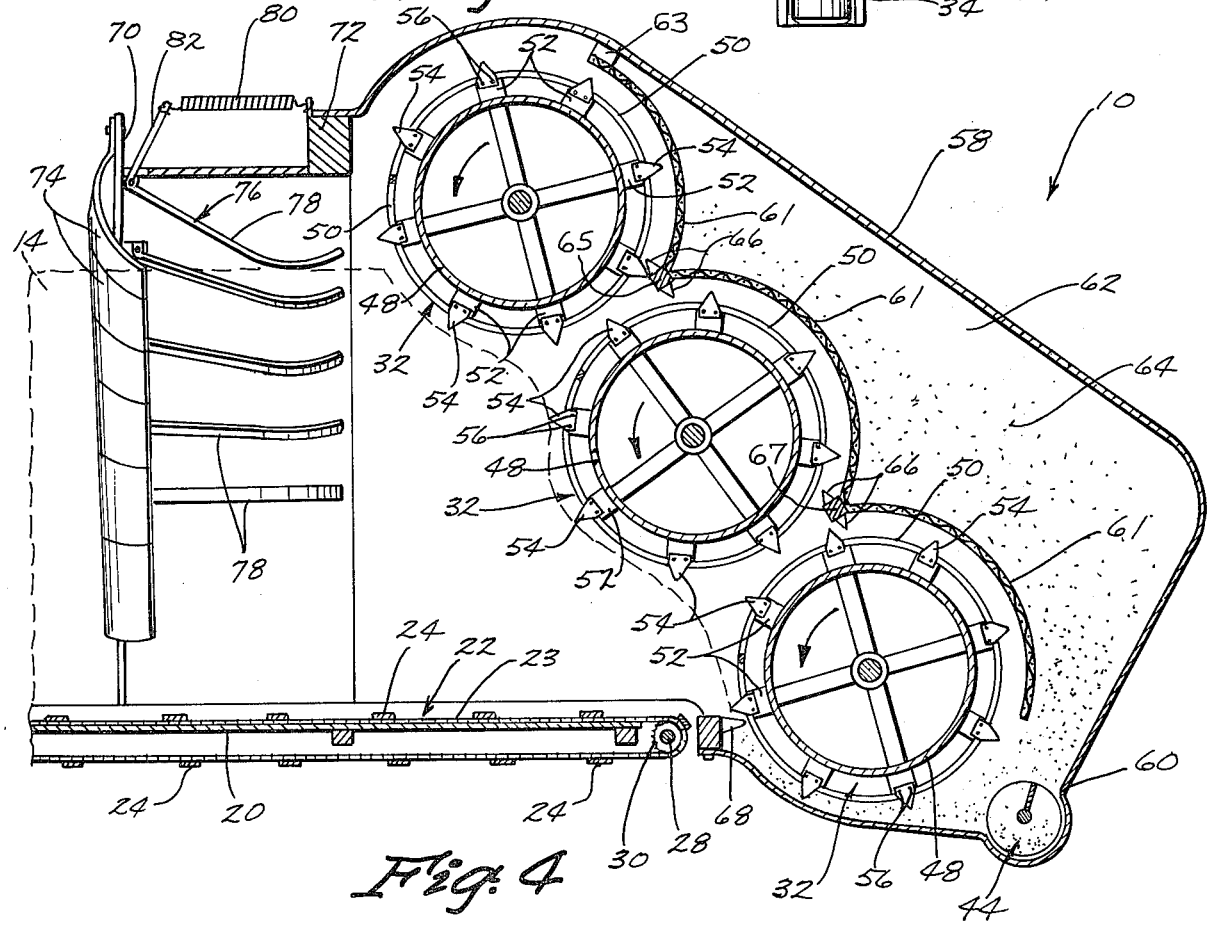
FIG. 4 is a cross sectional view taken along line 4-4 in FIG. 3.
Figure 5:
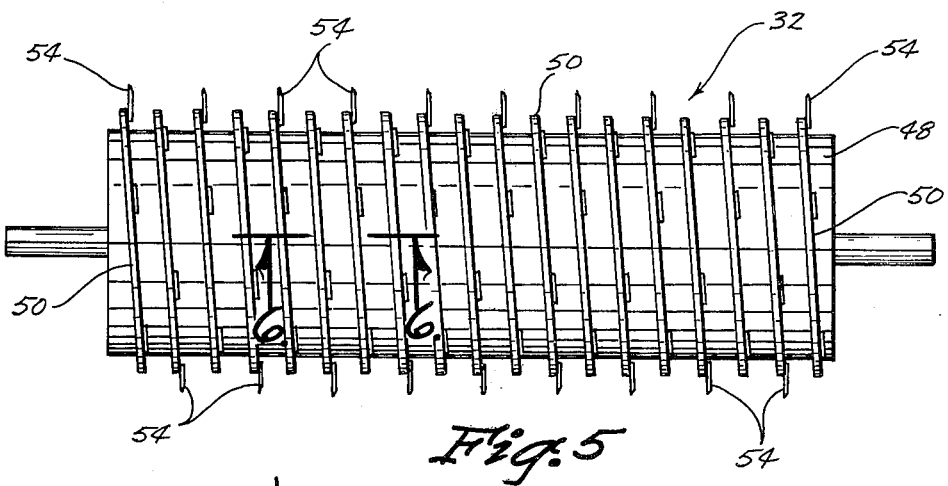
FIG. 5 is a plan view of a cutter.
Figure 6:
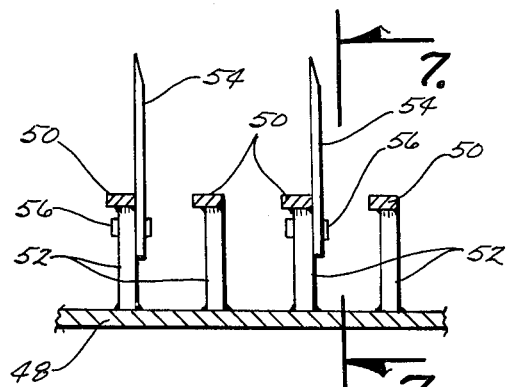
FIG. 6 is a cross sectional view taken along line 6-6 in FIG. 5.
Figure 7:
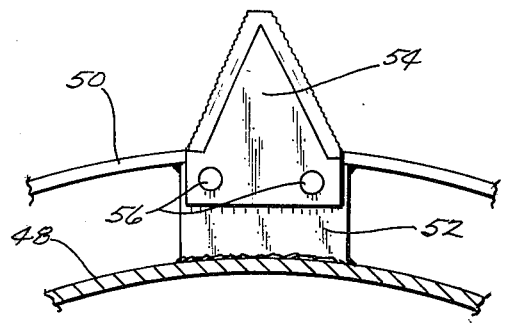
FIG. 7 is a cross sectional view taken along line 7-7 in FIG. 6.

The blades 54 on adjacent cutters cooperate with each other as they are in overlapping relationship as seen in FIG. 4 and also cooperate with oppositely extending cutter blades 66 between adjacent cutters at the juncture of the concave screens 61. Blades 66 are secured to supports 65 and 67 as seen in FIG. 4. A forwardly extending blade 68 is provided between the feeder conveyor and the lower cutter to cooperate with the cutter blades 54. It is understood that the stationary blades 66 and 68 extend the full width of the machine.

The round bales 14 are guided into the cutters 32 by being fed through a throat defined by an arcuate frame 70 connected to the housing frame 72. The arcuate frame 70 includes rearwardly extending flexible rubber flaps 74 which also extend radially inwardly and rearwardly to present a convex surface to the round bales 14. These flaps are positioned over the top and along the sides of the bales adjacent the feeder conveyor.

Also connected to the arcuate frame 70 is a plurality of L-shaped forwardly extending fingers 76 including finger portions 78 adapted to bear against the round bales 14 due to springs 80 connected to the actuating leg 82 of the L-shaped finger members. The springs 80 are anchored to the housing 72 as seen in FIG. 4. The flaps 74 and spring biased fingers 76 function to guide the round bales into the cutters 32 while also tending to compress it inwardly and smoothing out its outer surface.

Thus it is seen in operation that the large giant round bales 14 are brought in from the field and unloaded onto the feeder conveyor 12 which automatically controls the feeding of the bales into the chopper and shredder machine 16 through the inlet throat comprising the flaps 74 and the spring biased fingers 76. The stair-step cutters 32 move the hay downwardly against the feeder conveyor. The hay is chopped and shredded and moves down to a discharge auger 44 in the bottom of the housing 58 which includes the chamber 62 in communication with the discharge conveyor 44 such that any shredded hay forced through the screen 61 over the cutters is fed to the discharge auger 44. The cutting blades 54 cooperate with adjacent cutting blades on adjacent cutters as well as with stationary blades 66 and 68. The number of cutters will vary with the size of the bales being fed into the machine. An unloading auger 90 is pivotally connected to the discharge auger 44 for selectively feeding the chopped and shredded hay to storage areas or feeding stations. The speed of the feeder conveyor 12 is controlled by the potential meter which in turn is a function of the load placed on the cutters 32 such that they do not become clogged by being overfed by the feeder conveyor. An approximate time of six minutes is typical for grinding a single giant bale of hay.

It is understood that hay in different configurations may be handled such as Heston stacks.

I claim:

1. A bale hay chopper and shredder comprising, a feeder having forward and rearward ends, a plurality of rotary cylindrical cutters extending across said feeder at the forward end to receive bales of hay, said plurality of cylindrical cutters positioned along a plane extending upwardly from the forward end and rearwardly over said feeder, each of said cutters having cutting blades which cooperate with the cutting blades on the cutter adjacent thereto to chop and shred the hay, fixed cutting blades being mounted between said cutters, said fixed cutting blades cooperating with said cutting blades on said cutters to shread and chop the hay, and a discharge conveyor under said cutters for removing cut and chopped hay.

2. The structure of claim 1 wherein a housing encloses the back side of said cutters and includes a screen having curvature corresponding to the curvature of said cutters, said screens being closely spaced from said cutters, and said screen and said housing being spaced to provide a chamber which is in communication with said discharge conveyor.

3. The structure of claim 1 wherein said cutters are further defined as consisting of three cutters.

4. The structure of claim 1 wherein said housing is further defined as having a mouth over said feeder rearwardly of said cutters including inwardly and forwardly extending pivotal spring biased guide fingers arcuately arranged to press upon said hay passing through said mouth on said feeder.

5. The structure of claim 4 wherein said fingers are arranged over the top and down the opposite sides of said mouth.

6. The structure of claim 5 wherein said mouth is further defined as including flexible convex flaps positioned rearwardly and over said fingers, said flaps secured at their outer ends to an arcuate frame member with their free ends extending rearwardly and radially inwardly, said fingers being pivotally secured to and extending forwardly of said frame member.

7. The structure of claim 1 wherein each of said cutters includes a cylinder and a spiral ring extends around said cylinder being spaced from and secured thereto by upstanding posts, said blades being secured to said ring whereby said blades are spaced apart along said spiral ring and longitudinally along said cylinder parallel to its axis of rotation and said ring limits the hay from getting between said blades and said cylinder.

8. The structure of claim 7 wherein stationary cutting blades are provided between adjacent cutters and between the lowermost cutter and said feeder for cooperation with said cutting blades on said cutters as said cutters are rotated for chopping and shredding said hay.

* * * * *